US012563037B2

(12) United States Patent
Senecal et al.

(10) Patent No.: US 12,563,037 B2
(45) Date of Patent: Feb. 24, 2026

(54) SECURITY MONITORING UTILIZING DEVICE SIGNATURE DETECTION

(71) Applicant: ARKOSE LABS HOLDINGS, INC., San Mateo, CA (US)

(72) Inventors: David Senecal, Fremont, CA (US); Luke Stork, Pacifica, CA (US)

(73) Assignee: Arkose Labs Holdings, Inc., San Mateo, CA (US)

( * ) Notice: Subject to any disclaimer, the term of this patent is extended or adjusted under 35 U.S.C. 154(b) by 418 days.

(21) Appl. No.: 18/219,559

(22) Filed: Jul. 7, 2023

(65) Prior Publication Data

US 2024/0039912 A1      Feb. 1, 2024

Related U.S. Application Data

(60) Provisional application No. 63/393,375, filed on Jul. 29, 2022.

(51) Int. Cl.
*H04L 9/40* (2022.01)

(52) U.S. Cl.
CPC .......... *H04L 63/0876* (2013.01); *H04L 63/10* (2013.01); *H04L 63/104* (2013.01); *H04L 63/107* (2013.01)

(58) Field of Classification Search
CPC ... H04L 63/0876; H04L 63/10; H04L 63/104; H04L 63/105; H04L 63/106; H04L 63/107
See application file for complete search history.

(56) References Cited

U.S. PATENT DOCUMENTS

| | | | | |
|---|---|---|---|---|
| 7,200,753 B1 * | 4/2007 | Shinzaki | ................ | G06V 40/10 |
| | | | | 713/168 |
| 10,084,780 B2 * | 9/2018 | Bao | ........................ | H04L 63/126 |
| 11,888,870 B2 * | 1/2024 | Garyani | ................ | G06F 21/554 |
| 2009/0102650 A1 * | 4/2009 | Diener | .................... | E05B 45/06 |
| | | | | 340/542 |
| 2009/0102652 A1 * | 4/2009 | Diener | .................... | E05B 45/06 |
| | | | | 340/545.6 |

(Continued)

FOREIGN PATENT DOCUMENTS

| | | | | | |
|---|---|---|---|---|---|
| AU | 4362400 A | * | 11/2000 | ....... | G01N 27/44726 |
| CA | 2370749 A1 | * | 10/2000 | ....... | G01N 27/44782 |

*Primary Examiner* — Khanh Q Dinh
(74) *Attorney, Agent, or Firm* — Womble Bond Dickinson (US) LLP

(57) ABSTRACT

A method of authenticating a user device in providing access to a computer resource, the method includes: extracting a plurality of device fingerprint records from an access log, each of the device fingerprint records associated with an unauthorized access of a computer resource; from each of the plurality of device fingerprint records, extracting a digital signature, each of the digital signatures comprising a plurality of session characteristics; determining, by a processing device from the digital signatures, a root signature pattern, the root signature pattern comprising a combination of values of one or more of the plurality of session characteristics; and identify a subsequent access request for the computer resource as an unauthorized access based on a comparison of a device fingerprint associated with the subsequent access request and the root signature pattern.

20 Claims, 7 Drawing Sheets

(56)  References Cited

U.S. PATENT DOCUMENTS

| 2009/0102653 A1* | 4/2009 | McGinnis | G06Q 10/087 |
| | | | 705/28 |
| 2010/0042632 A1* | 2/2010 | Johnson | G06F 11/3476 |
| | | | 702/187 |
| 2017/0214701 A1* | 7/2017 | Hasan | H04L 63/1433 |
| 2018/0212947 A1* | 7/2018 | Chen | H04W 12/06 |
| 2020/0394531 A1* | 12/2020 | Rigotti | H04L 9/0861 |
| 2023/0376926 A1* | 11/2023 | Richter | G06Q 20/407 |
| 2024/0039912 A1* | 2/2024 | Senecal | H04L 63/0876 |

* cited by examiner

250

310

FINGERPRINT:     CHAR1:CHAR2:CHAR3:CHAR4:CHAR5:CHAR6:CHAR7:CHAR8: . . . :CHARN

252

SIGNATURE:     CHAR2:CHAR4:CHAR6:CHAR8

255A     (e.g., os+os_version:CFP:screen_size:device_params:browser_name+version)

ROOT SIGNATURE
PATTERN A:     CHAR2: = A
                CHAR4: = B
                CHAR6: = VARY

255B     CHAR8: = VARY

ROOT SIGNATURE
PATTERN B:     CHAR2: = A
                CHAR4: = C
                CHAR6: = D
                CHAR8: = VARY

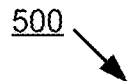

500

EXTRACT A PLURALITY OF DEVICE FINGERPRINT
RECORDS FROM AN ACCESS LOG, EACH OF THE DEVICE
FINGERPRINT RECORDS ASSOCIATED WITH AN
UNAUTHORIZED ACCESS OF A COMPUTER RESOURCE
510

FROM EACH OF THE PLURALITY OF DEVICE FINGERPRINT
RECORDS, EXTRACT A DIGITAL SIGNATURE, EACH OF THE
DIGITAL SIGNATURES COMPRISING A PLURALITY OF
SESSION CHARACTERISTICS
520

DETERMINE, FROM THE DIGITAL SIGNATURES, A ROOT
SIGNATURE PATTERN, THE ROOT SIGNATURE PATTERN
COMPRISING A COMBINATION OF VALUES OF ONE OR
MORE OF THE PLURALITY OF SESSION CHARACTERISTICS
530

IDENTIFY A SUBSEQUENT ACCESS REQUEST FOR THE
COMPUTER RESOURCE AS AN UNAUTHORIZED ACCESS
BASED ON A COMPARISON OF A DEVICE FINGERPRINT
ASSOCIATED WITH THE SUBSEQUENT ACCESS REQUEST
AND THE ROOT SIGNATURE PATTERN
540

SECURITY MONITORING UTILIZING DEVICE SIGNATURE DETECTION

CROSS-REFERENCE TO RELATED APPLICATIONS

This application claims the benefit of U.S. Provisional Application No. 63/393,375, filed on Jul. 29, 2022, the entire content of which is hereby incorporated by reference herein.

FIELD

The present disclosure generally relates to protecting access to computer resources. The disclosure relates more particularly to apparatus and techniques for identifying attempted access by unauthorized or malicious parties and the methods they employ to attempt defeating protection in place.

BACKGROUND

Computer resources are often created for access by humans and the creators may seek to reduce or block access to those computer resources when the access is by unintended users such as an automated process (or bot) that is attempting access or by unintended human users who may be attempting to access the computer resources in ways unintended or undesired by their creators. For example, a web server serving web pages related to a topic may be set up for human users to browse a few pages but not set up for an automated process to attempt to browse and collect all available pages or for persons employed to scrape all of the data. As another example, a ticket seller may wish to sell tickets to an event online, while precluding unauthorized resellers from using an automated process to scrape data off the ticket seller's website and buy up large quantities of tickets.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments without departing from the spirit and scope of the described embodiments.

FIG. 5 is a flow diagram of a method of authenticating a user device in providing access to a computer resource, in accordance with one or more aspects of the disclosure.

DETAILED DESCRIPTION

Figure 1:
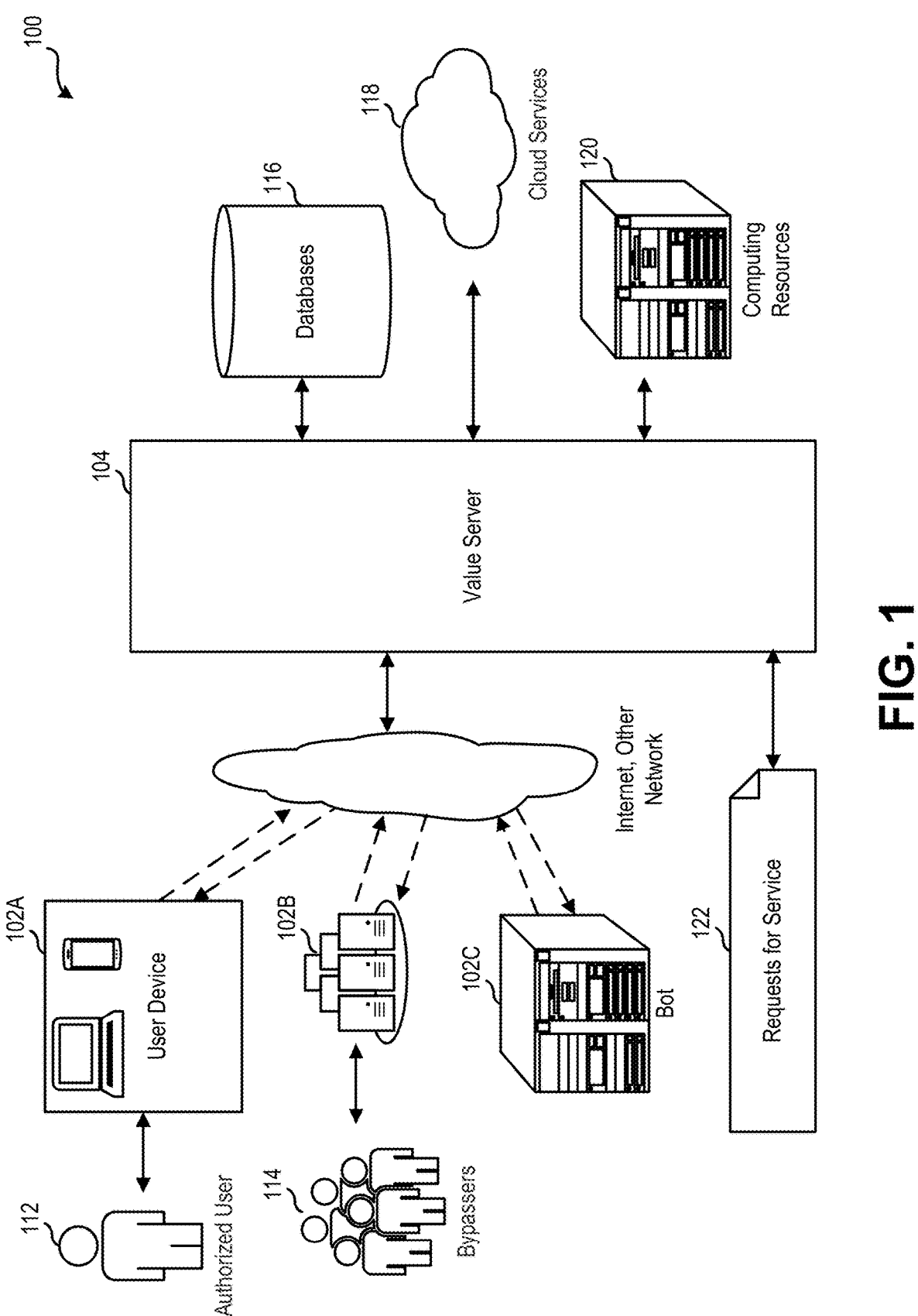
FIG. 1 is a block diagram of a network environment wherein an authentication challenge system may be deployed, in accordance with some embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Unauthorized access and/or unwanted access to computer resources may be used to cause damage, such as highly-repetitive access to a computer resource in order to block others from accessing it, causing servers to crash, flooding comment sections with messages, creating a large number of fictitious identities in order to send spam or bypass limits, skewing results of a vote or poll, entering a contest many times, brute force guessing of passwords or decryption keys, or the like. In some cases, the computer resources can be protected with a system that may perform user authentication, such as presenting authentication challenges in order to distinguish authorized users of a computing asset from unauthorized users. In some cases, as part of the protection of the computer resources, the system may incorporate a fingerprint from the accessing device and/or associated browser that represents characteristics of the accessing device and/or associated browser. Unauthorized users may include unauthorized human users, users attempting to bypass controls ("bypassers"), and/or unauthorized automated agents.

A provider of computer resources may wish to determine whether a given user accessing those computer resources is a legitimate human user, an automated process, or a bypasser, given that access to the resources would be computer-mediated in each case. For example, companies and other organizations may create materials and make them available online, sometimes via intermediaries that charge per view. These organizations may spend huge sums, or make significant efforts, in creating and disseminating these materials, but wish to ensure that real, human consumers in their target audience view particular materials, as automated agents can generate false impressions that someone in the target audience has viewed the materials when in fact no real human in the target audience has done so. In some cases, there may be humans accessing that content, but not be in the target audience, such as someone deployed to access the content without viewing the materials. Companies and other organizations lose the effect of the money they pay by spending for these false impressions by unintended users, whether human or not.

Many providers of computer resources have implemented mechanisms to attempt to distinguish human users from "bots" or other automated access constructs. For example, the providers may implement challenges or other types of mechanisms to attempt to detect automated access scripts. However, unauthorized users have developed various automated means to impersonate human access. For example, clients accessing computer resources often do so via web browsers or other types of internet viewing applications. These browsers/applications may provide information regarding their underlying computing device. This information may be referred to as a fingerprint, or digital fingerprint.

As an example, a digital fingerprint may refer to a set of data associated with a session between a user device and a value server providing a computer resource. The set of data of the fingerprint may include specific information and/or characteristics that characterize the user device.

This fingerprint can be used by the computer resource, for example, to tailor the experience of the computer resource to the client device. The fingerprint can include characteristics regarding the client device, including the underlying hardware, an operating system of the client device, the type of application being used to access the computer resource, a version of the application being used, and the like.

In some cases, providers of computer resources may use this fingerprint information as a means of detecting a human user, assuming that such information indicated a "real" computing device with a valid human user. In response to this, unauthorized users began spoofing these characteristics of the digital fingerprint, providing essentially fake characteristics. For example, a fully automated "bot" program might provide a fingerprint simulating a user running a WINDOWS™-based operating system and a commercial browser of a recent level, despite the access being driven by an automated script. To further confuse any authorization mechanisms based on these characteristics, the unauthorized users might randomize certain ones of the characteristics between consecutive accesses to further provide an illusion of different people accessing the computer resource.

Aspects of the disclosure address the above-noted and other deficiencies by providing an authorization system that is capable of extracting a signature from a fingerprint that can identify an unauthorized user attempting to masquerade as a human and/or authorized user. The signature may be a pattern of values associated with a subset of the characteristics of the digital fingerprint that identifies a particular session as being associated with an unauthorized user. The signature may include a pattern having a first set of values that are constant, and a second set of values that varies, in some cases randomly. A root signature pattern may be further identified that determines the portions of the signature that do not vary, and a randomization/variation strategy of the signature may be identified based on the root signature pattern. With knowledge of the root signature, as well as an understanding of the way elements of the fingerprint may be varied, a provider of a computer resource may more readily identify unauthorized users and block and/or restrict their access to the computer resource. Thus, among other benefits, embodiments of the present disclosure provide improved security to providers of computer resources, and reduce unauthorized access to the computer resources. By providing an improved authorization scheme, embodiments of the present disclosure increase a reliability of a computer resource and reduce and/or eliminate impacts to the computer resource that may be caused by unauthorized access.

FIG. 1 is a block diagram of a network environment 100 in which an authentication challenge system may be deployed, in accordance with some embodiments of the present disclosure. In the example shown in FIG. 1, a user device 102A, a set of bypasser devices 102B, and a bot 102C may be attempting to obtain services from a value server 104. It is assumed in this example that a user 112 operating user device 102A is an authorized user to whom an operator of value server 104 is willing to provide services, whereas the operator is not willing to provide services to bypassers 114 using the set of bypasser devices 102B or to bot 102C. The particular services provided are not necessarily relevant to processes of trying to allow authorized access and trying to prevent unauthorized access, but examples are illustrated, including databases 116, cloud services 118, and computing resources 120. Those services may include serving webpages and interactions with users. Various devices may send requests 122 for services and receive in response the requested services, receive a challenge (possibly followed by the requested services if the challenge is met), or receive a rejection message. The challenge could be a process that is designed to filter out requesters based on an ability to meet a challenge and/or perform a task, which may be difficult and/or impossible for a bot 102C to perform and which may be potentially time-consuming for bypassers 114 to work on. The challenge may potentially make the requests economically infeasible for a hired set of bypassers 114 or other bypassers 114 who may not be interested in the requested services as much as bypassing controls for others or for various reasons, all while limiting a burden on an authorized legitimate user (e.g., authorized user 112) of the services.

Figure 2A:
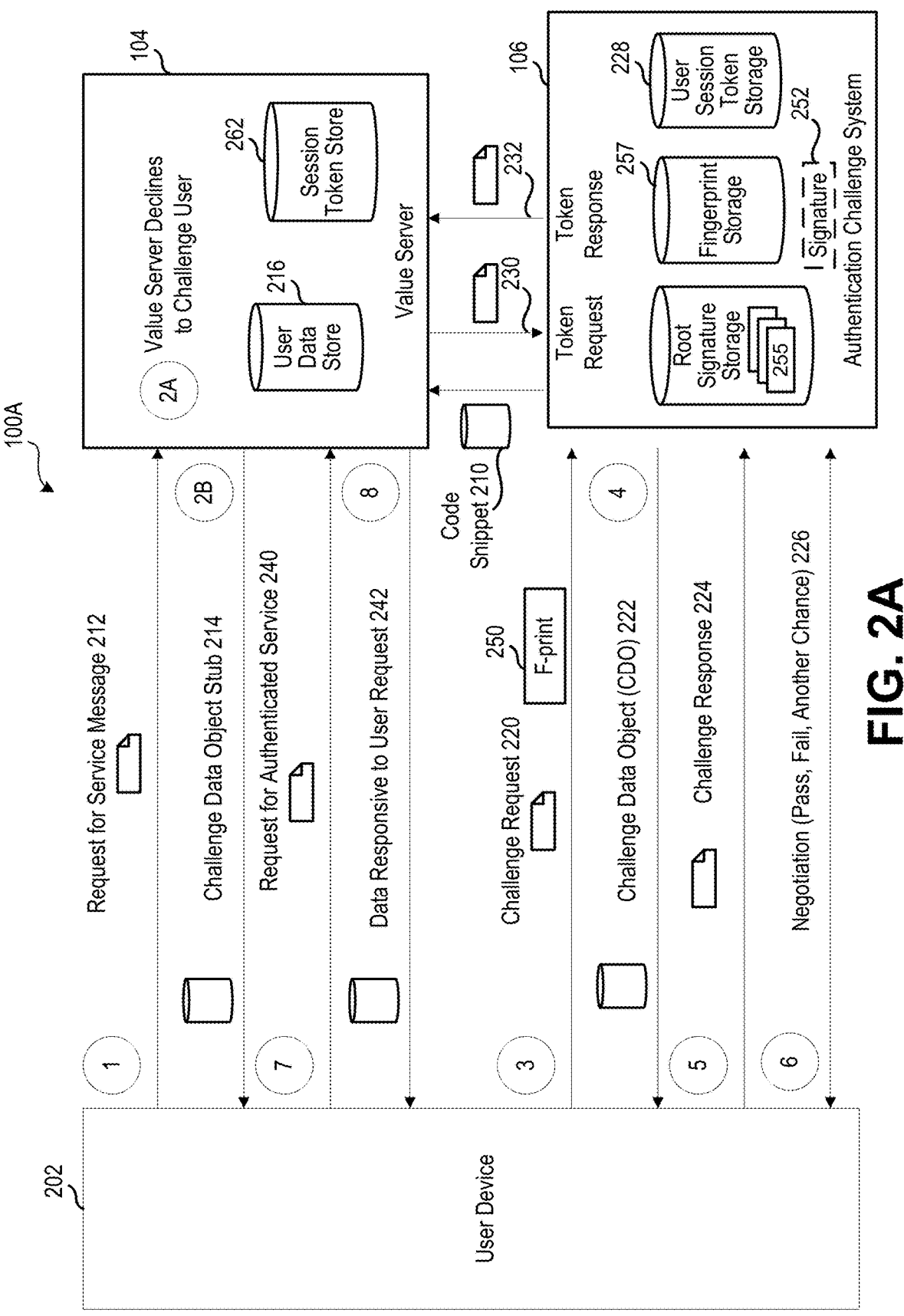
FIGS. 2A and 2B are block diagrams of authentication challenge systems and example components, in accordance with some embodiments of the present disclosure.

FIG. 2A is a block diagram of an authentication challenge system 100A and example components, in accordance with some embodiments. Messages and data objects that are passed among components are shown in greater detail than in FIG. 1, but user device 202 in FIG. 2A may correspond to user device 102A in FIG. 1, a bypasser device 102B of FIG. 1, or bot 102C of FIG. 1.

Also illustrated in FIG. 2A are indicators of a typical order of steps of communications among user device 202, value server 104, and an authentication challenge system 106. It should be noted that other orders of steps may be taken, and some steps may be omitted or added. In a precursor step, authentication challenge system 106 may supply value server 104 a code snippet 210 usable by value server 104 for handling challenges.

In an operational process illustrated, user device 202 may send a "request for service" message 212 to value server 104 (referenced as communication "1"). Value server 104 may then determine whether a challenge is to be provided and either declines to challenge the user device 202 making the request (communication 2A) or to challenge the user device 202 making the request. For example, where user device 202 is already logged in and authenticated to value server 104, value server 104 may have enough information to be able to skip a challenge process and may respond to the user request immediately without requiring further authentication.

In the case where value server 104 decides to challenge, value server 104 may send (communication 2B) a challenge data object (CDO) stub 214 to user device 202. CDO stub 214 may have been supplied as part of code snippet 210 from the authentication challenge system 106. In some embodiments, either an entire CDO 222 or CDO stub 214 may be sent, and may include information about the user or the request and such information may be encrypted or signed such that user device 202 cannot easily alter the information without that alteration being detected. Such information may include details about the user that are known to value server 104, such as an IP address associated with the request, country of origin of the request, past history of the user, if known, etc. This data may be stored as user data in user data store 216.

CDO stub 214 may be code, a web page, or some combination that is designed to have user device 202 issue a challenge request 220 (communication 3). For example, CDO stub 214 may be code that generates and transmits a challenge request 220, or it may be a web page that is displayed by user device 202, perhaps with a message like "Click on this line to get validated before you can access the requested resource" with the link directed to authentication challenge system 106.

Challenge request 220 may include fingerprint data 250. Fingerprint data 250 may be a digital fingerprint representing configuration details of user device 202. In some embodiments, the configuration details may include data that may be typically included in an HTTP request. Data provided in the fingerprint 250 may include user configuration data, characteristics of user device 202, environmental characteristics (e.g. sensor readings), operating system characteristics, user behavior, and/or browser characteristics. In some embodiments, the fingerprint data 250 may be retrieved by the CDO stub 214 and/or collected/provided by a web browser making the challenge request 220. In some embodiments, the authentication challenge system 106 may store the received fingerprint 250 in fingerprint storage 257.

In response to receiving challenge request 220, the authentication challenge system 106 may analyze the fingerprint data 250 to determine whether the user device 202 is likely to be associated with an unauthorized access. For example, as will be described further herein, the authentication challenge system may extract a signature 252 from the fingerprint data 250. The signature 252 may be compared to a plurality of root signature patterns 255 that are associated with indications of unauthorized access.

Figure 3:
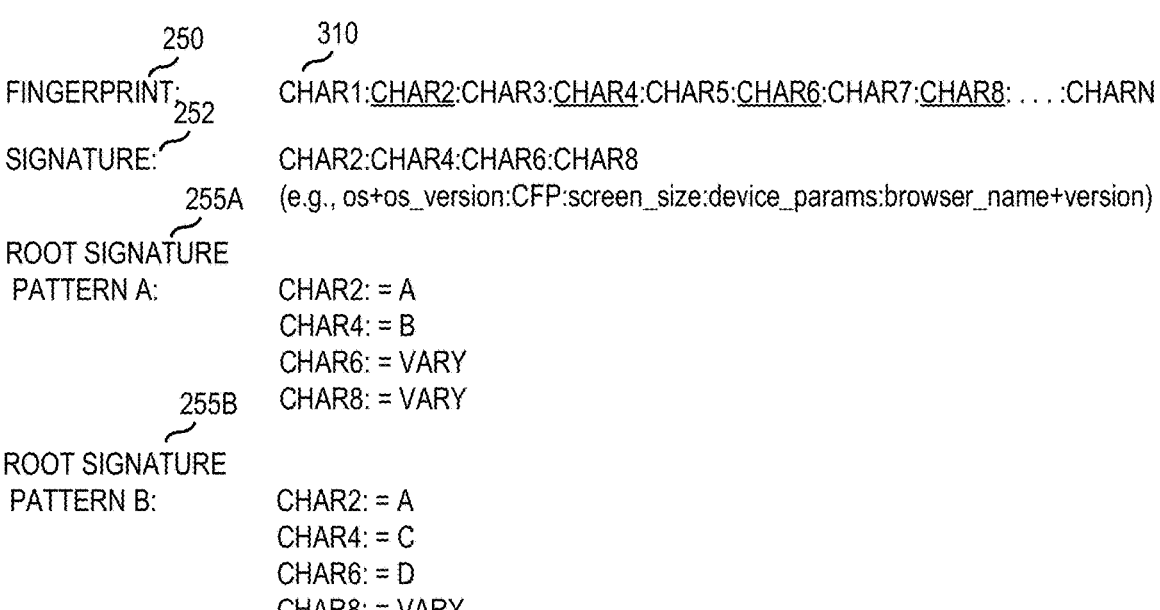
FIG. 3 illustrates an example structure of a digital fingerprint and signature, in accordance with some embodiments of the present disclosure.

FIG. 3 illustrates an example structure of a digital fingerprint 250 and signature 252, in accordance with some embodiments of the present disclosure. Referring to FIG. 3, the fingerprint 250 may include a number of data fields 310. Each of the data fields 310 may be a data value enumerating one or more characteristics of the user device 202 or challenge request 220 (see, e.g., FIG. 2A). In FIG. 3, N characteristics are shown for the data fields 310, labeled as CHAR1 through CHARN, but this is merely for ease of description. Similarly, in FIG. 3 the data fields 310 of the fingerprint 250 are illustrated as being colon-delimited, but this is merely an example. The data fields 310 of the fingerprint 250 may be provided in any number of formats, and the embodiments of the present disclosure are not limited to the structure illustrated in FIG. 3.

As discussed herein, the data fields 310 may include user configuration data (e.g., a user of the user device 202), characteristics of user device 202, environmental characteristics (e.g. sensor readings of the user device 202 and/or an environment of the user device 202), operating system characteristics (e.g., of an operating system of the user device 202), user behavior, and/or browser characteristics (e.g., a browser of the user device 202 used to make the request for service 212). The data fields 310 may include numerical values, string values, and the like.

From the data fields 310 of the fingerprint 250, a signature 252 may be derived. The signature 252 may include a subset of the data fields 310 of the fingerprint 250. The data fields 310 of the signature 252 may be those data fields 310 that are most common (e.g., in combination) with uniquely identifying a set of fingerprints sent by one or more user devices 202 that take part in unauthorized access (e.g., a botnet). For example, the signature 252 may include those data fields 310 that have been identified (e.g., via machine learning and/or statistical analysis) to uniquely identify a particular set of fingerprints from a plurality of accesses to a value server 104.

In FIG. 3, the signature 252 is illustrated as containing four data fields 310: CHAR2, CHAR4, CHAR6, and CHAR8 (also underlined in the fingerprint 250). These data fields 310 are merely an example configuration of the signature 252, and not intended to limit the embodiments of the present disclosure. Similarly, in FIG. 3 the data fields 310 of the signature 252 are illustrated as being colon-delimited, but this is merely an example. The data fields 310 of the signature 252 may be provided in any number of formats, and the embodiments of the present disclosure are not limited to the structure illustrated in FIG. 3.

As an example, the signature 252 may contain the following data fields: operating system, operating system version, canvas fingerprint data, screen size, device parameters, browser name, and browser version.

The operating system data field may refer to an operating system of the user device 202, and the operating system version may refer to the particular version of that operating system. For example, the operating system may be iOS, Windows, Linux, MacOS, Android, or the like, and the version may be (though is not limited to be) a numerical version. In some embodiments, the operating system and operating system version may be enumerated together, as, e.g., "Android6.0.1," or "MacOSX10_15_7."

The canvas fingerprint (CFP) is a data field 310 that is a function of the web browser used by the user device 202 and/or a graphic card that may be installed on the user device 202. As an example, a CFP may be based on HyperText Markup Language 5 (HTML5), which provides a canvas feature. As an example, the canvas feature may be leveraged to perform graphical operations (e.g., drawing text or other images) and the resulting image may be converted to a numerical value (e.g., via encoding and/or hashing). The resulting value may be different for different computers, depending on the browser rendering the image and their graphics capabilities. A non-limiting example of a CFP value may be "306275228."

The screen size data field 310 may represent the size of the physical screen of the user device 202 and/or the available resolution of the physical screen. A non-limiting example of the screen size may be "600×900×1600×856" or "640×360×640×360.

The device parameters data field 310 may include a number of different parameters that are related to the user device 202. In some embodiments, a number of parameters may be concatenated together (e.g., in a string) to represent different types/values of parameters for the user device 202. For example, the device parameters data field 310 may include data including a platform of the web browser, whether the user device 202 is a mobile device, whether the user device 202 supports cookies, a number of logical processors of the user device 202, a color depth of the user device 202, whether local storage is available for the user device 202, whether an open database is available for the user device 202, whether session storage is available for the user device 202, whether the user device 202 supports behavior tracking, whether touch support is supported by the user device 202, and a list (or a hash of the list) of supported fonts of the user device 202. A non-limiting example of the device parameters may be "Linux armv7l::true::true::24::4::1::0::0::1::0::1::1" or "Win32::false::true::24::64::1::1::1::1::0::0::0::D41D8."

The browser name data field 30 may refer to a name of the web browser being used by the user device 202, and the browser version may refer to the particular version of that web browser. For example, the browser may be Firefox, Roblox, Chrome, Opera, or the like, and the version may be (though is not limited to be) a numerical version. In some embodiments, the browser name and browser version may be enumerated together, as, e.g., "Chrome101.0.4951.64," or "Firefox84.0."

From the signature 252, one or more root signature patterns 255 may be generated. A root signature pattern 255 may include one or more of the data fields 310 of the signature 252 with particular values. For example, a root signature pattern 255 may be formed by setting one or more data fields 310 of the signature 252 to a constant value. As will be discussed further herein, the root signature pattern 255 may be compared to signatures 252 extracted from fingerprints 250 to determine if a given user device 202 may be suspected as being associated with an unauthorized set of devices 202 or botnet. FIG. 3 and the other figures may use like reference numerals to identify like elements. A letter after a reference numeral, such as "255A," indicates that the text refers specifically to the element having that particular reference numeral. A reference numeral in the text without a following letter, such as "255," refers to any or all of the elements in the figures bearing that reference numeral.

Two examples of root signature patterns 255 are illustrated in FIG. 3, for convenience of discussion only. A first root signature pattern 255A may include a value of 'A' for the data field 310 CHAR2, a value of 'B' for the data field 310 CHAR4, and values for data fields 310 CHAR6 and CHAR8 may vary. Thus, a signature 252 that has a value of 'A' for data field 310 CHAR2, a value of 'B' for data field 310 CHAR4, and any value for data fields 310 CHAR6 and CHAR8 may be determined to match the first root signature pattern 255A. This may indicate that two different fingerprints 250 having different values for a data field 310 of the signature 252 that varies as part of the root signature pattern 255 may nonetheless identify the same user device 202, albeit a user device 202 that is altering one or more of the data fields 310 of its fingerprint 250 in an attempt to appear as a different user device 202.

A second root signature pattern 255B may include a value of 'A' for the data field 310 CHAR2, a value of 'C' for the data field 310 CHAR4, a value of 'D' for the data field 310 CHAR6, and the value for data field 310 CHAR8 may vary. Thus, a signature 252 that has a value of 'A' for data field 310 CHAR2, a value of 'C' for data field 310 CHAR4, a value of 'D' for data field 310 CHAR6, and any value for data field 310 CHAR8 may be determined to match the second root signature pattern 255B.

In some embodiments, the root signature patterns 255 may correspond to signatures 252 that have been associated with unauthorized access attempts. The root signature patterns 255 may indicate attack patterns in which an unauthorized user "spoofs" a signature 252, but as part of the attack pattern, varies some values of the signature 252 to attempt to portray different user devices 202, despite being driven by an automated script or other program. Methods and/or systems to generate the root signature patterns 255 will be discussed further herein.

Referring back to FIG. 2A, the authentication challenge system 106 may include a storage of a collection of the root signature patterns 255. The root signature patterns 255 may indicate signatures 252 that may be associated with unauthorized or otherwise unwanted accesses to value server 104.

The authentication challenge system 106 may extract a signature 252 from the fingerprint 250 provided by the challenge request 220. The authentication challenge system 106 may compare the signature 252 to each of the plurality of root signature patterns 255. For example, as described herein with respect to FIG. 3, a signature 252 may match one or more of the root signature patterns 255 if the constant values of the root signature pattern 255 match the values of the signature 252 for the same data fields 310. For data fields 310 of the root signature pattern 255 that are identified as varying, the same data fields 310 of the signature 252 may be considered a match regardless of the value of the data field 310.

If the signature 252 associated with the fingerprint 250 of the challenge request 220 matches one of the root signature patterns 255, the access attempt may be classified as suspicious. For a suspicious access attempt, the authentication challenge system 106 may perform one or more actions to increase a security of the value server 104. In some embodiments, the authentication challenge system 106 may refuse a challenge request 220 from a user device 202 that is identified as suspicious. This may result in the user device 202 being denied access to the value server 104.

In some embodiments, if the authentication challenge system 106 detects that the challenge request 220 is suspicious based on the signature 252, the authentication challenge system 106 may increase a difficulty of a challenge to be presented to the user device 202, or require multiple challenges be solved successfully. For example, the authentication challenge system 106 may include a plurality of different types of challenges that may be presented to a user device 202. Some challenges may take less time and be less burdensome for the user device 202, but may be less reliable with regard to detecting an unauthorized access. Some challenges may be more complicated, and thus potentially frustrating to a user, but may be better at detecting unauthorized access. In response to determining that the challenge request 220 is suspicious, the authentication challenge system 106 may select the more complicated challenge for the user device 202.

After determining the status of the challenge request 220 (e.g., whether a signature 252 of the fingerprint 250 matches one of the root signature patterns 255), the authentication challenge system 106 may respond (communication 4) with a challenge data object (CDO) 222. CDO 222 may include code, a web page, or some combination that can be processed by user device 202 to present a challenge to a user of user device 202. As previously discussed, the CDO 222 may be selectively chosen based, at least in part, on a result of the comparison of the signature 252 of the fingerprint 250 with the root signature patterns 255. The authentication challenge system 106 may then await a response from user device 202, typically while handling other activities asynchronously. User device 202 may send a challenge response 224 (communication 5) to the authentication challenge system 106. The challenge response 224 may be a result of input provided by the user of the user device 202. For example, the challenge response 224 may be generated in response to interaction of one or more input devices (e.g., a keyboard, mouse, touch screen, speaker, etc.) of the user device 202. The authentication challenge system 106 can process challenge response 224 in light of CDO 222 and evaluate whether the user satisfied the challenge represented in CDO 222 and then engage in a negotiation (explained in more detail below) with user device 202 (communication 6).

Challenge response message 224 may include, in addition to an indication of the user's response to the challenge, a challenge identifier that identifies CDO 222 that was sent to challenge the user, in which case the authentication challenge system 106 can easily match up the response with the challenge to determine if the response is consistent with an answer key for the specific challenge given.

In some embodiments, determining whether the user satisfied the challenge represented in CDO 222 may include determining whether the user successfully performed a task associated with the CDO 222. For example, the authentication challenge system 106 may determine whether the user device 202 provided the correct answer to a query, manipulated an object of the CDO 222 correctly, or selected a correct set of images or other input prompts associated with the CDO 222.

If the authentication challenge system 106 determines that the challenge was met, communication 6 (negotiation 226) can be in the form of a "pass" message, while if the authentication challenge system 106 determines that the challenge was not met, communication 6 can be in the form of a "fail" message. Another alternative is a message indicating that the user has additional chances to try again, perhaps with a new challenge included with such alternative message (e.g., "Your answer did not seem right, given the challenge. Click here to try again.").

Challenge response 224 and/or challenge request 220 may include information from value server 104 that passed through user device 202, perhaps in a secured form. That information may allow the authentication challenge system 106 to identify the user and a user session for which the challenge is to apply. The authentication challenge system 106 may then store a user session token in user session token storage 228 indicating the results of the challenge. In some embodiments, the user session token may be stored in the user session token storage 228 in a way that is correlated with the associated fingerprint 250, such that a particular fingerprint 250 in fingerprint storage 257 may be identified that corresponds with the user session token. Then, when value server 104 sends a token request 230 identifying the user and user session, authentication challenge system 206 can reply with a token response 232 indicating whether the user met the challenge, and possibly also that the user did not meet the challenge or that the user never requested a challenge or responded to one.

The CDO stub 214 may be such that the user device 202 may send a request for authenticated service to value server 104, such as a webpage portion that instructs "Once you are authenticated, click here to proceed to your desired content" or the like in the form of a request for authenticated service 240 (communication 7), which can signal to value server 104 that the user is asserting that they have completed the challenge. Of course, value server 104 need not trust the assertion, but may then be aware that the authentication challenge system 106 may indicate that the challenge was indeed correctly responded to. Request for authenticated service 240 may be sent by user device 202 without user interaction after user device 202 receives a success message related to negotiation 226.

At this point, the value server 104 can send token request 230 to authentication challenge system 206 and receive token response 232 from the authentication challenge system 106. In some embodiments, the value server 104 may wait a predetermined time period and send token request 230 without waiting for a signal from user device 202. In such embodiments, the user device 202 may not send a request for authenticated service after its initial request. In some embodiments, the authentication challenge system 106 may delay sending token response 232 if the authentication challenge system 106 is involved in processing a challenge with user device 202 such as when the user has not yet requested a challenge or has failed a challenge but is given another chance, so that the authentication challenge system 106 can ultimately send a token response indicating a successful response to the challenge.

In any case, the value server 104 may respond with data 242 responsive to the user request. If the authentication challenge system 106 can independently determine that user device 202 is operated by an authorized user, then authentication challenge system 106 may store a user session token in user session token storage 228 indicating that a challenge was met. In that case, the timing of receiving token request 230 may be less important, as the authentication challenge system 106 would be ready to respond at any time.

While just one challenge process was described in detail, it should be understood that value server 104 may process many requests in parallel and interact with more than one authentication challenge system and the authentication challenge system 106 may process requests from many user devices in parallel and interact with many value servers.

Once value server 104 receives token response 232 and token response 232 indicates that the user is authenticated and not an undesired user, value server 104 can determine its next step. Value server 104 may also store token response 232 into a session token store 262 usable for handling subsequent requests from the user. At this point in the process, whether value server 204 determined that no challenge was to be provided (2A) or determined a challenge was to be provided (2B) and has a token response 232 indicating that the challenge was met, value server 104 can respond to the request of the user device 202.

In some embodiments of the process, the processing may be done in a time period similar to a time period normally required for processing service requests. In other words, it could appear to the user that the processing is quick, except for the time the user takes to mentally process and respond to the challenge presented.

In the example shown in FIG. 2A, a value server 104 is configured to handle some of the authentication processes. Another variation may be used where the value server 104 does not handle any authentication and may not even be aware it is happening. This may be useful for securing legacy systems.

Figure 2B:
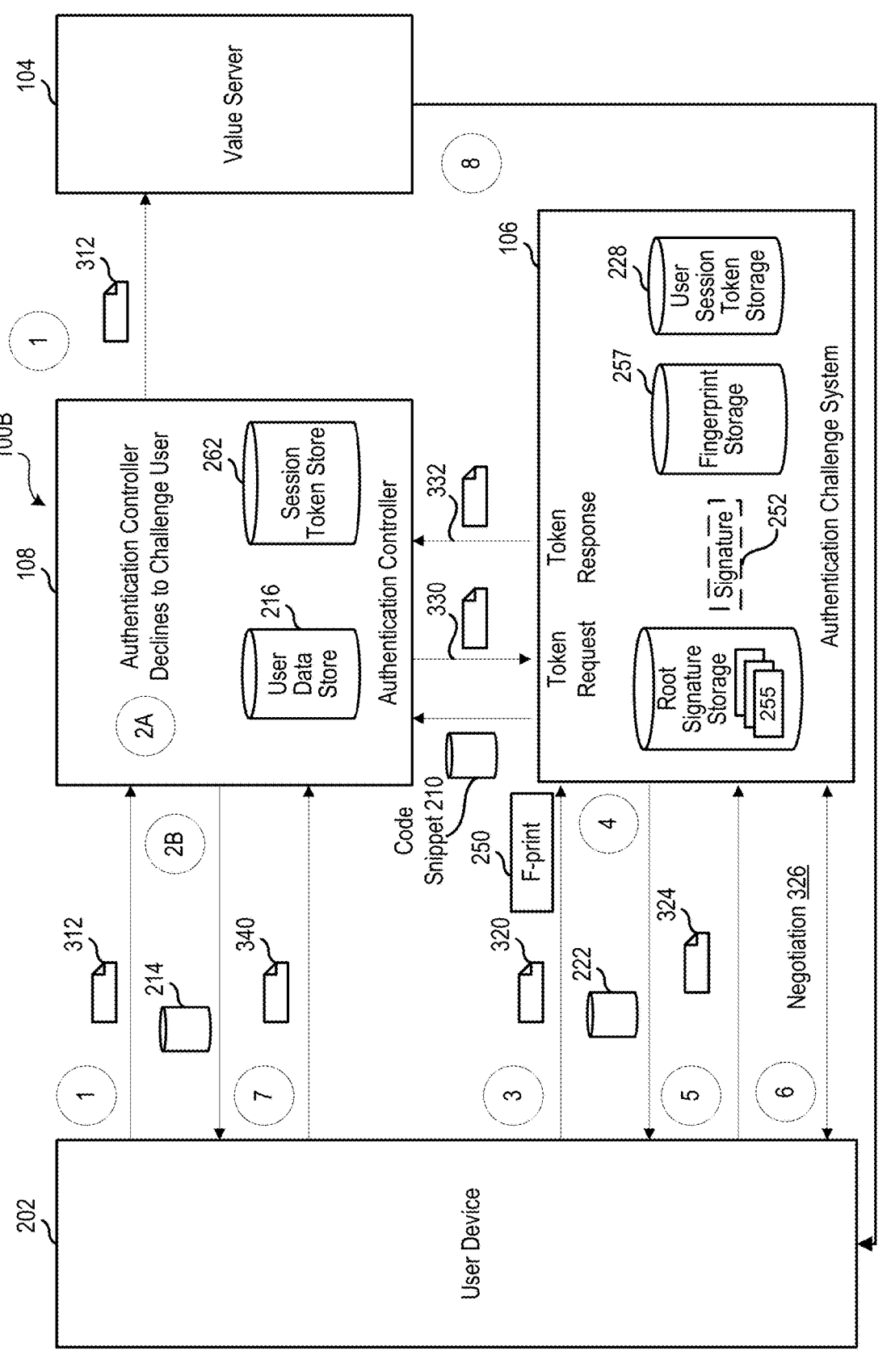

FIG. 2B is a block diagram of a system 100B in which a value server 104 is secured using an authentication controller 108 for access control such that requests from a user device 202 can be limited, mostly, to requests from authorized users. As shown in FIG. 2B, an authentication challenge system 106 and an authentication controller 108 together operate to control access of user device 202 to value server 104. As illustrated, a communication 1 comprises a request for services 312 from user device 202 to authentication controller 108 and may be a request similar to other requests described herein.

Also illustrated in FIG. 2B are indicators of a typical order of steps of communications among the user device 202, the value server 104, the authentication challenge system 106, and the authentication controller 108. It should be noted that other orders of steps may be taken, and some steps may be omitted or added. In a precursor step, the authentication challenge system 106 may supply the authentication controller 108 a code snippet 210 usable by authentication controller 108 for handling challenges. In some embodiments, the authentication challenge system 106 and the authentication controller 108 are integrated.

In an operational process illustrated, the user device 202 sends a "request for service" message 312 towards value server 104 (communication 1), which is either intercepted by authentication controller 108 or passed through to value server 104. As with the value server 104 of FIG. 2A, the authentication controller 108 determines whether a challenge is to be provided and either declines to challenge the user device 202 making the request (communication 2A) or to challenge the user device 202 making the request (communication 2B), possibly relying on user data in a user data store 216.

In the case where the authentication controller 108 decides to challenge, authentication controller 108 sends a challenge data object (CDO) stub 214 to user device 202 (communication 2B). The CDO stub 214 may be code, a web page, or some combination that is designed to have user device 202 issue a challenge request 320 (communication 3) to the authentication challenge system 106, similar to CDO stub 214 shown in FIG. 2A.

Challenge request 320 may include fingerprint data 250. Fingerprint data 250 may be a digital fingerprint representing configuration details of user device 202, as described herein with respect to FIGS. 2A and 3. In some embodiments, the fingerprint data 250 may be retrieved by the CDO stub 214 and/or collected/provided by a web browser making the challenge request 320. In some embodiments, the authentication challenge system 106 may store the received fingerprint 250 in fingerprint storage 257.

In response to receiving challenge request 320, the authentication challenge system 106 may analyze the fingerprint data 250 to determine whether the user device 202 is likely to be associated with an unauthorized access. For example, the authentication challenge system 106 may extract a signature 252 from the fingerprint data 250. The signature 252 may be compared to a plurality of root signature patterns 255 that are associated with indications of unauthorized access.

For example, as described herein with respect to FIGS. 2A and 3, a signature 252 may match one or more of the root signature patterns 255 if the constant values of the root signature pattern 255 match the values of the signature 252 for the same data fields 310. For data fields 310 of the root signature pattern 255 that are identified as varying, the same data fields 310 of the signature 252 may be considered a match regardless of the value of the data field.

If the signature 252 associated with the fingerprint 250 of the challenge request 320 matches one of the root signature patterns 255, the access attempt may be classified as suspicious. For a suspicious access attempt, the authentication challenge system 106 may perform one or more actions to increase a security of the value server 104. In some embodiments, the authentication challenge system 106 may refuse a challenge request 320 from a user device 202 that is identified as suspicious. This may result in the user device 202 being denied access to the value server 104. In some embodiments, if the authentication challenge system 106 detects that the challenge request 320 is suspicious based on the signature 252, the authentication challenge system 106 may increase a difficulty of a challenge to be presented to the user device 202, or require multiple challenges be solved successfully.

After determining the status of the challenge request 320 (e.g., whether a signature 252 of the fingerprint 250 matches one of the root signature patterns 255), the authentication challenge system 106 may respond (communication 4) with a CDO 222, similar to CDO 222 of FIG. 2A. The authentication challenge system 106 may then await a response from user device 202, typically while handling other activities asynchronously. User device 202 may send a challenge response 324 (communication 5) to the authentication challenge system 106. The challenge response 324 may be a result of input provided by the user of the user device 202. For example, the challenge response 324 may be generated in response to interaction of one or more input devices (e.g., a keyboard, mouse, touch screen, speaker, etc.) of the user device 202. The authentication challenge system 106 can process challenge response 324 in light of CDO 222 and evaluate whether the user satisfied the challenge represented in CDO 222 and then engage in a negotiation 326 with user device 202 (communication 6).

If the authentication challenge system 106 determines that the challenge was met, communication 6 (negotiation 326) can be in the form of a "pass" message, while if the authentication challenge system 106 determines that the challenge was not met, communication 6 can be in the form of a "fail" message. Another alternative is a message indicating that the user has additional chances to try again, perhaps with a new challenge included with such alternative message.

Challenge response 324 and/or challenge request 320 may include information from authentication controller 108 that passed through user device 202, perhaps in a secured form. That information may allow the authentication challenge system 106 to identify the user and a user session for which the challenge is to apply. The authentication challenge system 106 may then store a user session token in user session token storage 228 indicating the results of the challenge. In some embodiments, the user session token may be stored in the user session token storage 228 in a way that is correlated with the associated fingerprint 250, such that a particular fingerprint 250 in fingerprint storage 257 may be identified that corresponds with the user session token. Then, when authentication controller 108 sends a token request 330 identifying the user and user session, the authentication challenge system 106 can reply with a token response 332 indicating whether the user met the challenge, and possibly also that the user did not meet the challenge or that the user never requested a challenge or responded to one. The authentication challenge system 106 and/or the authentication controller 108 may have logic to delay token request 330 and/or token response 332 to give the user time to complete a challenge but can send token request 330 after receiving a request for authenticated service 340 (communication 7). For example, the authentication challenge system 106 may wait ten seconds after receiving token request 330 before responding with token response 332 if the user has not yet requested a challenge or has failed a challenge but is given another chance. The authentication controller 108 may have logic to delay sending token request 330 to give the user some time to complete a challenge process with the authentication challenge system 106.

If the authentication challenge system 106 can independently determine that the user device 202 is operated by an authorized user, then the authentication challenge system 106 may store a user session token in user session token storage 228 indicating that a challenge was met. While just one challenge process was described in detail, it should be understood that the authentication controller 108 may process many requests in parallel and interact with more than one authentication challenge system and more than one value server 104 and the authentication challenge system 106 may process requests from many user devices in parallel and interact with many authentication controllers.

Once the authentication controller 108 receives the token response 332 and the token response 332 indicates that the user is authenticated and not an undesired access, the authentication controller 108 can determine its next step. The authentication controller 108 may also store token response 332 into a session token store 262 usable for handling subsequent requests from the user. At this point in the process, whether the authentication controller 108 determined that no challenge was to be provided (2A) or determined a challenge was to be provided (2B) and has a token response 332 indicating that the challenge was met, the authentication controller 108 can forward the user's request to the value server 104, which may respond (communication 8) to user device 202 as if no authentication took place.

As with embodiments where a value server 104 handles some of the tasks, all of the processing may be done in a time period similar to a time period normally required for processing service requests and CDOs may be created in advance for quick deployment. In some of these steps and examples, the communication and/or message or data sent corresponds to what is depicted in FIG. 2B and described herein.

Though FIG. 2B illustrates an embodiment in which the extraction of the signature 252 and the comparison to the root signature patterns 255 are performed on the authentication challenge system 106, the embodiments of the present disclosure are not limited to such a configuration. In some embodiments, the authentication controller 108 may perform one or more of the extraction of the signature 252 and the comparison to the root signature patterns 255. In such embodiments, additional communication between the user device 202 and the authentication controller 108 may transfer a fingerprint 250 of the user device 202 to the authentication controller 108. The authentication controller 108 may then extract the signature 252 from the fingerprint 250 to compare to the root signature patterns 255.

When the authentication controller 108 performs the comparison if the signature 252 to the root signature patterns 255, the authentication controller 108 may use the results of the comparison to determine whether no challenge is to be provided (2A) to the user device 202 or determined whether a challenge is to be provided (2B) to the user device 202. For example, if the signature 252 does not match one of the root signature patterns 255, no challenge may be provided (2A) to the user device 202.

Figure 4:
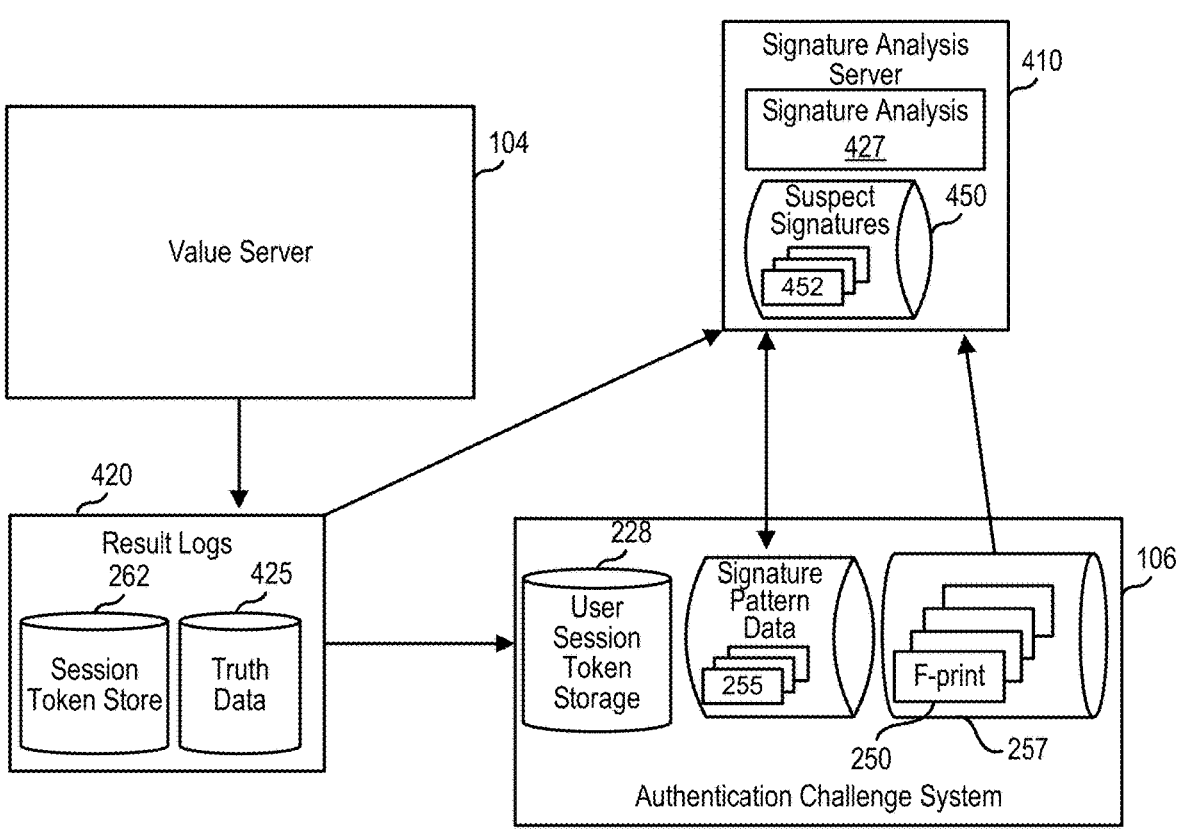
FIG. 4 is a block diagram illustrating a signature analysis server configured to generate root signature patterns, in accordance with some embodiments of the present disclosure.

FIG. 4 is a block diagram illustrating a signature analysis server 410 configured to generate root signature patterns 255, in accordance with some embodiments of the present disclosure. A description of elements of FIG. 4 that have been previously described will be omitted for brevity.

FIG. 4 illustrates the authentication challenge system 106 and the value server 104 described herein with respect to FIGS. 1, 2A, and 2B. As previously described, the authentication challenge system 106 may process requests for access to the value server 104. As a result of these access attempts the value server 104 may generate result logs 420. The result logs 420 may include the session token store 262 and truth data 425. The session token store 262 may include a collection of the user session tokens that were received from the authentication challenge system 106 during the authentication of the accesses of the value server 104, as described herein with respect to FIGS. 2A and 2B.

The truth data 425 may include a characterization of a particular access attempt, and may be correlated with the user session tokens of the session token store 262. For example, the truth data 425 may include data that indicates whether a particular access was considered authorized or unauthorized. The truth data 425 may be based, for example, on an analysis of the access by a particular user device 202 after the user device 202 was granted access to the value server 104. The truth data 425, for example, may indicate which session tokens were incorrectly flagged as legitimate, but were ultimate determined to be unauthorized. For example, a given access may have been analyzed and determined to be authorized by the authentication challenge system 106, but subsequent analysis by the value server 104 (or an associated infrastructure) may determine that the user device 202 associated with the access (and the provided user session token) was actually a "bot." In some embodiments, the truth data 425 may be generated by the execution of computer program instructions that analyze an access history of a given user device 202 using heuristics against protected endpoints of the value server 104 and extract the corresponding list of user session tokens that have been processed incorrectly.

In some embodiments, the signature analysis server 410 may be provided access to the result logs 420 including the truth data 425. In some embodiments, the result logs 420 may be uploaded to the signature analysis server 410 by an owner/administrator of the value server 104 or an automated script using an application programming interface (API). In some embodiments, the result logs 420 may be provided as a data file (e.g., as a comma-separated values (CSV) file or other data format). In FIG. 4, though the signature analysis server 410 is illustrated as being separated from authentication challenge system 106, this is only an example. In some embodiments, the signature analysis server 410 may be integrated and/or within the authentication challenge system 106

The signature analysis server 410 may extract the most common root signature patterns 255 associated with the unauthorized sessions of the value server 104 and will identify an attack strategy (e.g., a list of data fields 310 of the signature 252 that are randomized or varied). The output can be used to create customer-specific telltales to block the attack signature moving forward.

To determine the root signature patterns, the signature analysis server 410 may analyze the result logs 420 to determine the user sessions (e.g., using the session token store 262 and/or the user session token storage 228) associated with the accesses of the truth data 425 that were later determined to be unauthorized. Next, based on the user sessions identified as being unauthorized, the signature analysis server 410 may identify the fingerprints 250 of the fingerprint storage 257 that are associated with the unauthorized user sessions. As previously noted, the authentication challenge system 106 may store the user sessions in user session token storage 228 is such a way that the user session tokens, and thus the user sessions, can be correlated to their respective fingerprints 250. The signature analysis server 410 may extract the fingerprints 250 corresponding to the unauthorized user session from the fingerprint storage 257. This may result in a large list of fingerprints 250 data values, which may be hundreds of thousands or even millions of record in size.

Next, the signature analysis server 410 may extract the respective signatures 252 from the fingerprints 250. As discussed with respect to FIG. 3, the signature 252 may be a subset of the data fields 310 of the fingerprint 250. In some embodiments, the data fields 310 that make up the signature 252 may be predetermined. For example, in some embodiments the data fields 310 that make up the signature 252 may include the following data fields 310: operating system, operating system version, canvas fingerprint data, screen size, device parameters, browser name, and browser version. In some embodiments, one or more of the data fields 310 may be combined as part of the signature 252 (e.g., operating system and operating system version).

In some embodiments, the data fields 310 of the signature 252 may be dynamically determined. For example, in some embodiments each of the data fields 310 of the fingerprint 250 may be provided to a machine learning and/or statistical algorithm along with the resulting determined status of the access (e.g., legitimate (authorized) or non-legitimate (unauthorized)). The machine learning and/or statistical algorithm may determine which of the data fields 310 of the fingerprint 250 are most correlated with unauthorized accesses.

The signature analysis server 410 may extract, for each of the fingerprints 250 in the list of fingerprints 250, the values for the data fields 310 of the signature 252. This may result in a large list 450 of suspect signature 452 data values, which, as with the list of fingerprints 250, may be hundreds of thousands or even millions of records in size.

Next, the signature analysis server 410 may clean the list of suspect signatures 452. For example, the signature analysis server 410 may extract outliers within the list 450 or other entries that may be identified as incorrect or invalid. Then, the signature analysis server 410 may analyze the list 450 of suspect signatures 452 to determine the most common patterns that emerge in the remaining suspect signatures 452 through statistical analysis. In some embodiments, this or other analysis performed by the signature analysis server 410 may be performed by electronic circuitry and/or instruction code that performs signature analysis 427. This approach may determine the top values for various dimensions (e.g., os+osversion, CFP, screen size, device params, and browser+browser version) of the signature 252. The values or tuple of values that have an abnormal representation (e.g., a high ratio) in the list of suspect signatures 452 may be identified. In some embodiments, the common patterns may be processed and reduced to determine one or more root signature patterns 255 and determine a randomization strategy used for data fields 310 of the signature 252.

To determine the root signature pattern 255, a number of different statistical techniques may be applied. As previously noted, attackers attempting unauthorized access of a value server 104 often randomize various components of a signature 252 and/or fingerprint 250. To determine root signature patterns 255, the signature analysis server 410 may first determine the most common values for each data field 310 of the suspect signatures 452. For example, the signature analysis server 410 may determine the most common values of the os+osversion (e.g., a combination of the operating system and operating system version), CFP, screen size, device parameters, and browser+browser version (e.g., a combination of the browser and browser version) data fields 310.

Next, the signature analysis server 410 may determine the most common combinations of data fields 310. For example, the signature analysis server 410 may determine the combinations of the data fields 310 when no data field 310 is assumed to be randomized. For example, the signature analysis server 410 may determine the most frequent occurrences of the combined values of the combination of "os+ os_version||CFP||screen_size||device_params||browser-_name+browser_version." Stated another way, this analysis may determine the number of times a same combination of particular values for each of the data fields 310 of the combination occurs within the suspect signatures 452.

Next, the signature analysis server 410 may determine the most common combinations of data fields 310 when two data fields 310 are assumed to be randomized. For example, the signature analysis server 410 may determine the most frequent occurrences of the combined values various combinations of three fields of five fields of the signature 252. This yields the set of combinations described below:

os+os_version||CFP||screen_size
    os+os_version||CFP||device parameters
    os+os_version||CFP||browser_name+browser version
    os+os_version||screen_size||device parameters os+os_version||screen_size||browser_name+browser_ver-
      sion
    os+os_version||device      parameters||browser_name+
      browser version
    CFP||screen_size||device parameters
    CFP||screen_size||browser_name+browser version
    CFP||device parameters||browser_name+browser_version
    screen_size||device      parameters||browser_name+
      browser_version As with the prior analysis, this analysis may determine the number of times a same combination of particular values for each of the data fields 310 for each of the above-listed combinations occurs within the suspect signatures 452.

By utilizing the statistical analysis described herein, it may be possible to identify one or more root signature patterns 255. As discussed herein with respect to FIG. 3. the root signature pattern 255 may identify particular values of the root signature pattern 255 that are static. An example of a root signature pattern 255 may be a signature 252 that contains a OS+OS version of "Windows10" and a screen size of "1920×1080×1920×1052" but has a browser+ browser version that varies or a device parameter list that varies. In some embodiments, the analysis can identify not only which data fields 310 vary, but which values they typically vary between. For example, one embodiment of a root signature pattern 255 may identify that an CFP value varies, but varies between finite values of 414114541, 990181253, 1038645234, −1519429487, 334050401. This information may be further used to identify an attacking strategy and/or an unauthorized access.

The root signature patterns 255 may be hundreds or even thousands of combinations of values for data fields 310 of the signature 252. The root signature patterns 255 and strategy may be provided to the authentication challenge system 106 for use in processing access requests, as described herein with respect to FIGS. 2A and 2B. In some embodiments, the root signature patterns 255 may be specific to a particular value server 104, but the embodiments of the present disclosure are not limited thereto. In some embodiments, root signature patterns 255 determined from accesses to one value server 104 may be used by an authentication challenge system 106 of another value server 104, thus increasing the scope of the benefits that may be derived from the techniques described herein.

FIG. 5 is a flow diagram of a method 500 of authenticating a user device in providing access to a computer resource, in accordance with one or more aspects of the disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed by authentication challenge system 106, the signature analysis server 410, and/or authentication controller 108 of at least FIGS. 2A and 2B.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Method 500 begins at block 510, where the processing logic extracts a plurality of device fingerprint records from an access log, each of the device fingerprint records associated with an unauthorized access of a computer resource. The device fingerprint records may be, for example, similar to the fingerprints 250 discussed herein with respect to FIGS. 1-4. The access log may be, for example, similar to fingerprint storage 257 discussed herein with respect to FIGS. 2A, 2B, and 4, though embodiments of the present disclosure are not limited thereto. Other types of access logs, such as the result logs 420 of FIG. 4 may include information containing fingerprints 250.

At block 520, the processing logic, may extract, from each of the plurality of device fingerprint records, a digital signature. Each of the digital signatures may include a plurality of session characteristics. The digital signatures may be, for example, similar to digital signatures 252 discussed herein with respect to FIGS. 2A to 4. The session characteristics may be, for example, similar to the data fields 310 discussed herein with respect to FIGS. 2A to 4.

In some embodiments, the session characteristics of the digital signature may describe a computing device, such as user device 202 described herein, accessing the computer resource. In some embodiments, values of session characteristics other than the one or more of the plurality of session characteristics vary between two or more of the digital signatures. In some embodiments, the plurality of session characteristics of the digital signature comprise one or more of: an operating system, an operating system version, a canvas fingerprint, a screen size, a device parameter, a browser name, or a browser version.

At block 530, the processing logic may determine, from the digital signatures, a root signature pattern, the root signature pattern comprising a combination of values of one or more of the plurality of session characteristics. The root signature pattern may be similar to root signature pattern 255 discussed herein with respect to FIGS. 2A to 4.

In some embodiments, to determine, from the digital signatures, the root signature pattern the processing logic is to perform a statistical analysis of the plurality of session characteristics of the digital signatures. In some embodiments, the statistical analysis of the plurality of session characteristics of the digital signatures includes ranking occurrences of combinations of values of a subset of the plurality of session characteristics of the digital signatures.

At block 540, the processing logic may identify a subsequent access request for the computer resource as an unauthorized access based on a comparison of a device fingerprint associated with the subsequent access request and the root signature patterns. The access request may be similar to the request for service 212, 312 and/or the challenge request 220, 320 discussed herein with respect to FIGS. 2A and 2B. In some embodiments, the processing logic is further to, responsive to identifying the subsequent access request for the computer resource as the unauthorized access, increase a difficulty of a challenge task provided in response to the subsequent access request.

Figure 6:
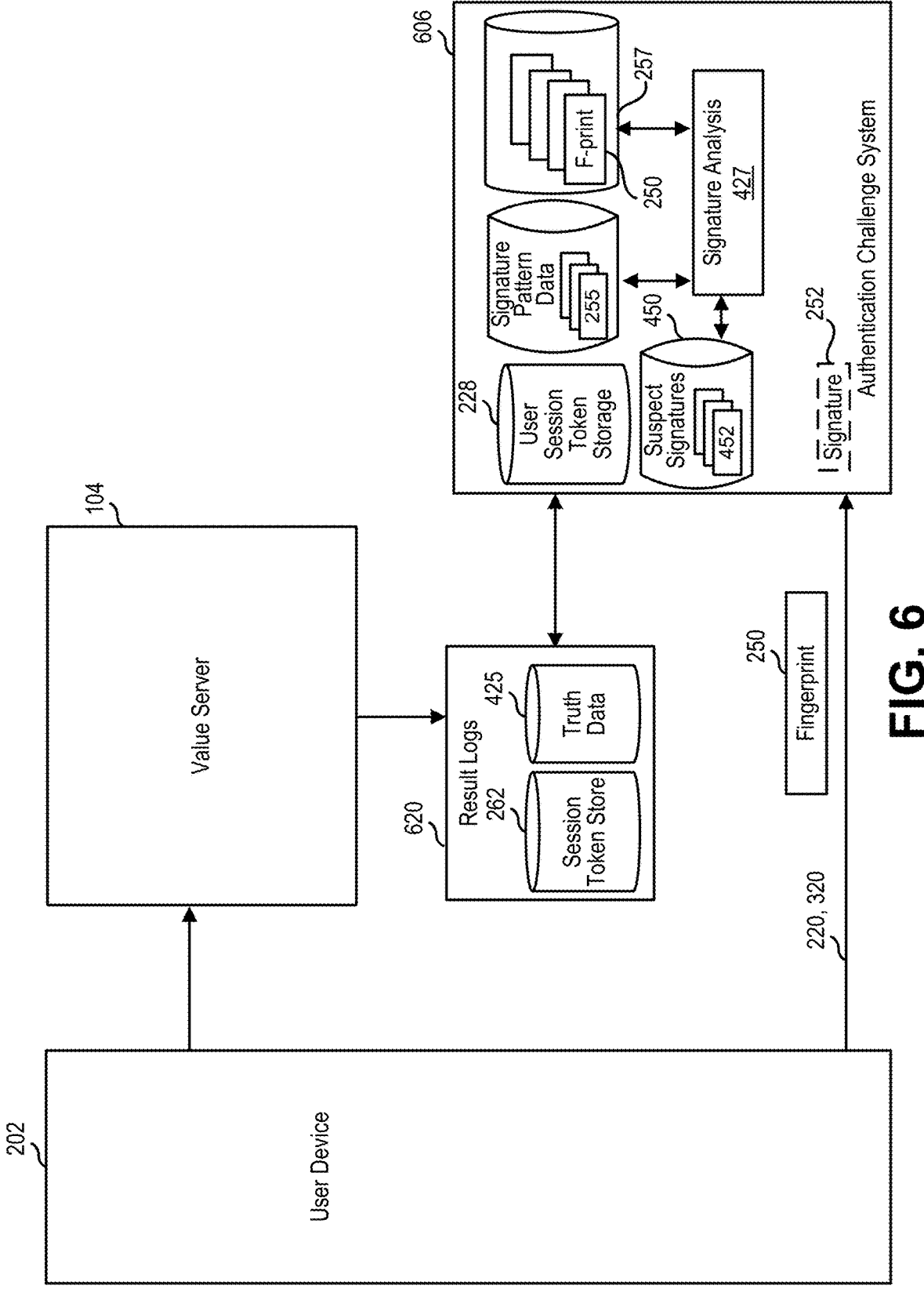
FIG. 6 is a block diagram illustrating an authentication challenge system configured to generate root signature patterns, in accordance with some embodiments of the present disclosure.

In some embodiments, the root signature analysis described may be provided in real-time, such that determinations made with regard to unauthorized accesses may be recognized and integrated into the response of the authentication challenge system 106. FIG. 6 is a block diagram illustrating an authentication challenge system 606 configured to generate root signature patterns, in accordance with some embodiments of the present disclosure. A description of elements of FIG. 6 that have been previously described will be omitted for brevity.

Referring to FIG. 6, the authentication challenge system 606 may be configured to receive and/or respond to a challenge request 220, 320 from a user device 202. The user device 202 in FIG. 6 may correspond to user device 102A in FIG. 1, a bypasser device 102B of FIG. 1, or bot 102C of FIG. 1. As discussed herein with respect to FIGS. 2A and 2B, the challenge request 220, 320 may be a result of a request for service 212, 312 from a user device 202 to a value server 104 or an authentication controller 108. The challenge request 220, 320 may include a fingerprint 250. The fingerprint 250 may be substantially as described herein with respect to the previous figures. As also described herein, fingerprints 250 and user session tokens associated with the accesses by the user device 202 may be stored in fingerprint storage 257 and user session token storage 228, respectively.

The challenge request 220, 320 may be one of a plurality of challenge requests 220, 320 made by a plurality of user devices 202 regarding requests for a computer resource provided by the value server 104. As a result of the requests, the value server 104 may have generated result logs 620 corresponding to the various requests. The result logs 620 may include the session token store 262 and truth data 425. The session token store 262 may include a collection of user session tokens that were received from the authentication challenge system 606 during the authentication of the accesses of the value server 104, as described herein with respect to FIGS. 2A and 2B. The truth data 425 may include a determination as to whether the corresponding accesses were legitimate (e.g., authorized) or non-legitimate (e.g., unauthorized). The truth data 425 may be updated in real-time by the value server 104 and/or infrastructure corresponding to the value server 104. For example, the value server 104 and/or infrastructure corresponding to the value server 104 may apply heuristics to accesses associated with the value server 104 to determine, in real-time, whether the access is authorized. For example, the value server 104 and/or infrastructure corresponding to the value server 104 may dynamically review behavior (e.g., electronic transactions) associated with accesses of the computer resource of the value server 104 to determine if particular activity is suspicious.

In some embodiments, the authentication challenge system 606 may be provided access to the result logs 620 including the truth data 425. In some embodiments, the result logs 620 may be periodically uploaded to the authentication challenge system 606 by, for example, the value server 104 and/or infrastructure corresponding to the value server 104. In some embodiments, the result logs 620 may be accessible by the authentication challenge system 606 over a network connection.

The authentication challenge system 606 may extract the most common root signature patterns 255 associated with the unauthorized sessions of the value server 104 and may identify an attack strategy (e.g., a list of data fields 310 of the signature 252 that are randomized). The output can be used to create customer-specific telltales to block the attack signature moving forward.

To determine the root signature patterns, the authentication challenge system 606 may analyze the result logs 620 to determine the user sessions associated with the accesses of the truth data 425 that were later determined to be unauthorized. In some embodiments, the analysis may be performed by circuitry and/or computer instructions associated with signature analysis 427. Next, based on the user sessions identified as being unauthorized, the authentication challenge system 606 may identify the fingerprints 250 of the fingerprint storage 257 that are associated with the authorized user sessions. As previously noted, the authentication challenge system 606 may store the user sessions in user session token storage 228 is such a way that the user session tokens, and thus the user sessions, can be correlated to their respective fingerprints 250. The signature analysis logic 427 may extract the fingerprints 250 corresponding to the unauthorized user session from the fingerprint storage 257. This may result in a large list (e.g., within fingerprint storage 257) of fingerprint 250 data values, which may be hundreds of thousands or even millions of record in size.

Next, the signature analysis logic 427 of the authentication challenge system 606 may extract the respective signatures 252 from the fingerprints 250. As discussed with respect to FIG. 3, the signature 252 may be a subset of the data fields 310 of the fingerprint 250. In some embodiments, the data fields 310 that make up the signature 252 may be predetermined. For example, in some embodiments the data fields 310 that make up the signature 252 may include the following data fields 310: operating system, operating system version, canvas fingerprint data, screen size, device parameters, browser name, and browser version. In some embodiments, the data fields 310 that make up the signature 252 may be dynamically determined.

The signature analysis logic 427 of the authentication challenge system 606 may extract, for each of the fingerprints 250 in the list of fingerprints 250, the values for the data fields 310 of the signature 252. This may result in a large list 450 of suspect signature 452 data values, which, as with the list of fingerprints 250, may be hundreds of thousands or even millions of records in size.

Next, the signature analysis logic 427 of the authentication challenge system 606 may clean the list of suspect signatures 452. For example, the authentication challenge system 606 may extract outliers within the list 450 or other entries that may be identified as incorrect or invalid. Then, the authentication challenge system 606 may analyze the list 450 of suspect signatures 452 to determine the most common patterns that emerge in the remaining suspect signatures 452 through statistical analysis. In some embodiments, this or other analysis performed by the authentication challenge system 606 may be performed by electronic circuitry and/or instruction code that performs signature analysis 427. This approach may determine the top values for various dimensions (e.g., os+osversion, CFP, screen size, device params, and browser+browser version). The values or tuple of values that have an abnormal representation (high ratio) in the list of suspect signatures 452 may be identified. In some embodiments, the common patterns may be processed and reduced to determine one or more root signature patterns 255 and determine a randomization strategy used for data fields 310 of the signature 252. Determining the root signature patterns may be performed according to one or more of the methods described herein with respect to FIGS. 4 and 5.

The root signature patterns 255 may be hundreds or even thousands of combinations of values for data fields 310 of the signature 252. The root signature patterns 255 and strategy may be used by the authentication challenge system 606 in processing the challenge request 220, 320, as described herein with respect to FIGS. 2A and 2B. Thus, the authentication challenge system 606 may extract a signature 252 from the fingerprint 250 received as part of the challenge request 220, 320 and compare the signature 252 to each of the root signature patterns 255.

If the signature 252 matches one of the root signature patterns 255, the authentication challenge system 606 may treat the challenge request 220, 320 as a suspicious access attempt. The authentication challenge system 606 may refuse the access attempt, log or otherwise additionally monitor the access attempt, and/or provide a more difficult challenge to the user device 202. For example, responsive to determining that the signature 252 of the user device 202 matches one of the root signature patterns 255, the authentication challenge system 606 may provide a CDO 222 to the user device 202 that is more difficult for an automated system to correctly solve, even though the CDO 222 may be more laborious for a human user.

The integrated authentication challenge system 606 may provide a number of technological improvements. By dynamically integrating the signature analysis into the authentication challenge system 606, the authentication challenge system 606 can more quickly take advantage of detected suspect signatures 452. For example, in some situations, a given attacker may utilize a particular attack strategy for a limited period of time, before switching. By integrating the analysis into the authentication challenge system 606 in substantially real time, the attack strategy may be detected in time to thwart these unauthorized access attempts. This may result in a more secure infrastructure with a higher level of security that is more capable of recognizing unauthorized and/or automated access attempts.

Figure 7:
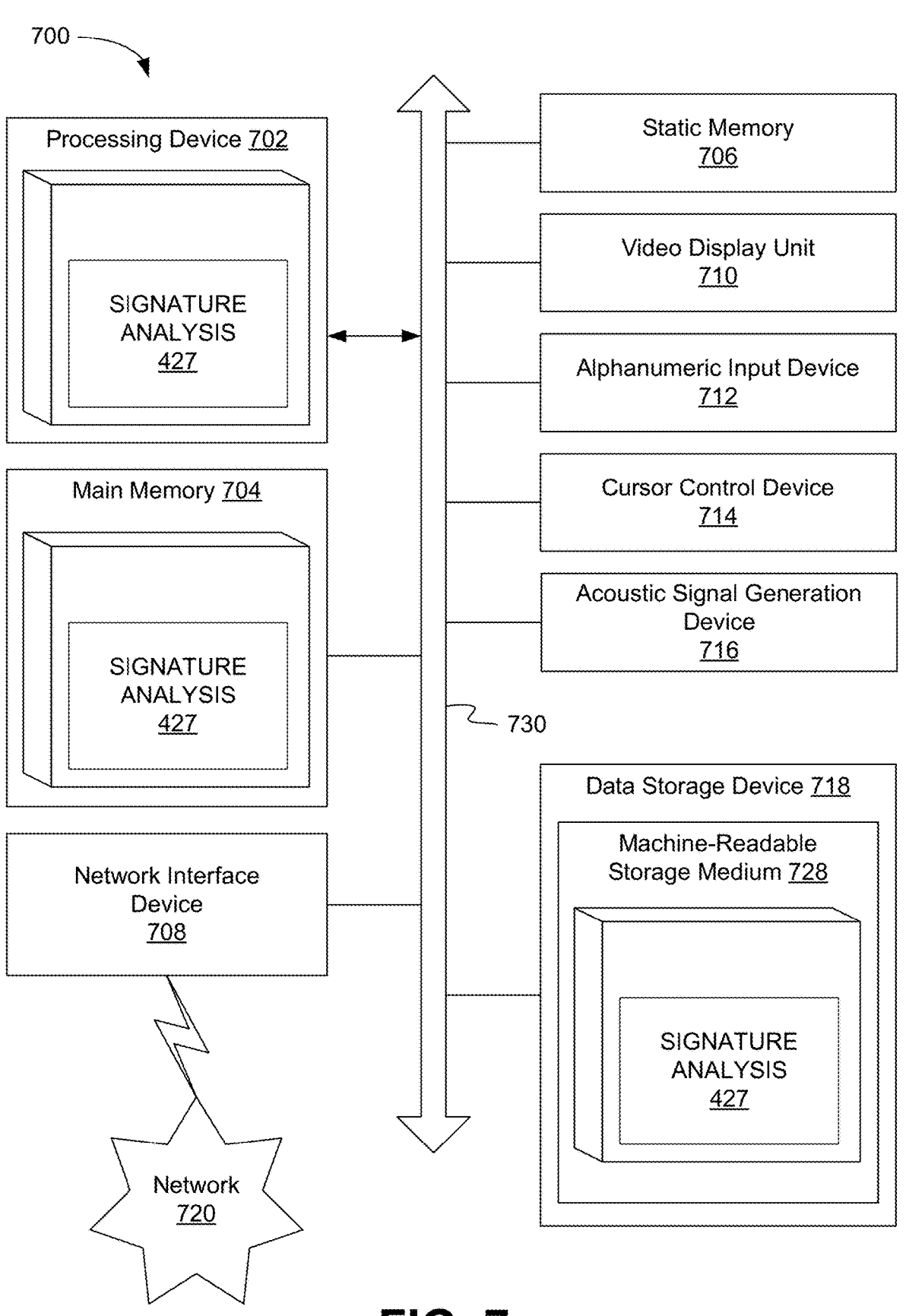
FIG. 7 is a block diagram of an example computing device that may perform one or more of the operations described herein, in accordance with one or more aspects of the disclosure.

FIG. 7 is a block diagram of an example computing device 700 that may perform one or more of the operations described herein, in accordance with one or more aspects of the disclosure. Computing device 700 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 700 may include a processing device (e.g., a general purpose processor, a PLD, etc.) 702, a main memory 704 (e.g., synchronous dynamic random access memory (DRAM), read-only memory (ROM)), a static memory 706 (e.g., flash memory and a data storage device 718), which may communicate with each other via a bus 730.

Processing device 702 may be provided by one or more general-purpose processing devices such as a microprocessor, central processing unit, or the like. In an illustrative example, processing device 702 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 702 may also include one or more special-purpose processing devices such as an application specific integrated circuit (ASIC), a field programmable gate array (FPGA), a digital signal processor (DSP), network processor, or the like. The processing device 702 may execute the operations described herein, in accordance with one or more aspects of the present disclosure, for performing the operations and steps discussed herein.

Computing device 700 may further include a network interface device 708 which may communicate with a network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and an acoustic signal generation device 716 (e.g., a speaker). In one embodiment, video display unit 710, alphanumeric input device 712, and cursor control device 714 may be combined into a single component or device (e.g., an LCD touch screen).

Data storage device 718 may include a computer-readable storage medium 728 on which may be stored one or more sets of instructions 725 that may include instructions for a suspicious signature detection and root signature pattern generation component, e.g., signature analysis 427, for carrying out the operations described herein, in accordance with one or more aspects of the present disclosure. Instructions 725 may also reside, completely or at least partially, within main memory 704 and/or within processing device 702 during execution thereof by computing device 700, main memory 704 and processing device 702 also constituting computer-readable media. The instructions 725 may further be transmitted or received over a network 720 via network interface device 708.

While computer-readable storage medium 728 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "detecting," "activating," "controlling," "directing", "determining," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting. As used herein, the term "and/or" includes any and all combination of one or more of the associated listed items.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112(f) for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A computer system comprising:
a processing device; and
a storage medium storing instructions, which when executed by the processing device, cause the processing device to:
    extract a plurality of device fingerprint records from an access log, each of the device fingerprint records associated with an unauthorized access of a computer resource;
    from each of the plurality of device fingerprint records, extract a digital signature, each of the digital signatures comprising a plurality of session characteristics;
    determine, from the digital signatures, a root signature pattern, the root signature pattern comprising a combination of values of one or more of the plurality of session characteristics; and
    identify a subsequent access request for the computer resource as an unauthorized access based on a comparison of a device fingerprint associated with the subsequent access request and the root signature pattern.

2. The computer system of claim 1, wherein the session characteristics of the digital signature describe a computing device accessing the computer resource.

3. The computer system of claim 1, wherein to determine, from the digital signatures, the root signature pattern the processing device is to perform a statistical analysis of the plurality of session characteristics of the digital signatures.

4. The computer system of claim 3, wherein the statistical analysis of the plurality of session characteristics of the digital signatures comprises ranking occurrences of combinations of values of a subset of the plurality of session characteristics of the digital signatures.

5. The computer system of claim 1, wherein values of session characteristics other than the one or more of the plurality of session characteristics vary between two or more of the digital signatures.

6. The computer system of claim 1, wherein the plurality of session characteristics of the digital signature comprise at least one of: an operating system, an operating system version, a canvas fingerprint, a screen size, a device parameter, a browser name, or a browser version.

7. The computer system of claim 1, wherein the processing device is further to:
    responsive to identifying the subsequent access request for the computer resource as the unauthorized access, increase a difficulty of a challenge task provided in response to the subsequent access request.

8. A non-transitory computer-readable storage medium storing instructions, which when executed by a processing device of a computer system, cause the processing device to:
    extract a plurality of device fingerprint records from an access log, each of the device fingerprint records associated with an unauthorized access of a computer resource;
    from each of the plurality of device fingerprint records, extract a digital signature, each of the digital signatures comprising a plurality of session characteristics;
    determine, by the processing device from the digital signatures, a root signature pattern, the root signature pattern comprising a combination of values of one or more of the plurality of session characteristics; and
    identify a subsequent access request for the computer resource as an unauthorized access based on a comparison of a device fingerprint associated with the subsequent access request and the root signature pattern.

9. The non-transitory computer-readable storage medium of claim 8, wherein the session characteristics of the digital signature describe a computing device accessing the computer resource.

10. The non-transitory computer-readable storage medium of claim 8, wherein to determine, from the digital signatures, the root signature pattern the processing device is to perform a statistical analysis of the plurality of session characteristics of the digital signatures.

11. The non-transitory computer-readable storage medium of claim 10, wherein the statistical analysis of the plurality of session characteristics of the digital signatures comprises ranking occurrences of combinations of values of a subset of the plurality of session characteristics of the digital signatures.

12. The non-transitory computer-readable storage medium of claim 8, wherein values of session characteristics other than the one or more of the plurality of session characteristics vary between two or more of the digital signatures.

13. The non-transitory computer-readable storage medium of claim 8, wherein the plurality of session characteristics of the digital signature comprise at least one of: an operating system, an operating system version, a canvas fingerprint, a screen size, a device parameter, a browser name, or a browser version.

14. The non-transitory computer-readable storage medium of claim 8, wherein the processing device is further to:
    responsive to identifying the subsequent access request for the computer resource as the unauthorized access, increasing a difficulty of a challenge task provided in response to the subsequent access request.

15. A method of authenticating a user device in providing access to a computer resource, the method comprising:
    extracting a plurality of device fingerprint records from an access log, each of the device fingerprint records associated with an unauthorized access of a computer resource;
    from each of the plurality of device fingerprint records, extracting a digital signature, each of the digital signatures comprising a plurality of session characteristics;

determining, by a processing device from the digital signatures, a root signature pattern, the root signature pattern comprising a combination of values of one or more of the plurality of session characteristics; and identify a subsequent access request for the computer resource as an unauthorized access based on a comparison of a device fingerprint associated with the subsequent access request and the root signature pattern.

16. The method of claim 15, wherein the session characteristics of the digital signature describe a computing device accessing the computer resource.

17. The method of claim 15, wherein determining, from the digital signatures, the root signature pattern comprises performing a statistical analysis of the plurality of session characteristics of the digital signatures.

18. The method of claim 17, wherein the statistical analysis of the plurality of session characteristics of the digital signatures comprises ranking occurrences of combinations of values of a subset of the plurality of session characteristics of the digital signatures.

19. The method of claim 15, wherein the plurality of session characteristics of the digital signature comprise at least one of: an operating system, an operating system version, a canvas fingerprint, a screen size, a device parameter, a browser name, or a browser version.

20. The method of claim 15, further comprising:

responsive to identifying the subsequent access request for the computer resource as the unauthorized access, increasing a difficulty of a challenge task provided in response to the subsequent access request.

\* \* \* \* \*